(12) United States Patent
Jang (10) Patent No.: US 10,354,645 B2
(45) Date of Patent: Jul. 16, 2019

(54) METHOD FOR AUTOMATIC EVALUATION OF NON-NATIVE PRONUNCIATION

(71) Applicant: HANKUK UNIVERSITY OF FOREIGN STUDIES RESEARCH & BUSINESS FOUNDATION, Yongin-si, Gyeonggi-do (KR)

(72) Inventor: Tae-Yeoub Jang, Seoul (KR)

(73) Assignee: HANKUK UNIVERSITY OF FOREIGN STUDIES RESEARCH & BUSINESS FOUNDATION, Yongin-si, Gyeonggi-do (KR)

( * ) Notice: Subject to any disclaimer, the term of this patent is extended or adjusted under 35 U.S.C. 154(b) by 0 days.

(21) Appl. No.: 16/009,910

(22) Filed: Jun. 15, 2018

(65) Prior Publication Data

US 2018/0366111 A1  Dec. 20, 2018

(30) Foreign Application Priority Data

Jun. 16, 2017 (KR) .......................... 10-2017-0076567

(51) Int. Cl.

| | |
|---|---|
| *G10L 15/187* | (2013.01) |
| *G10L 15/22* | (2006.01) |
| *G10L 15/02* | (2006.01) |
| *G10L 25/60* | (2013.01) |
| *G09B 19/04* | (2006.01) |
| *G10L 15/26* | (2006.01) |

(52) U.S. Cl.
CPC ............ *G10L 15/187* (2013.01); *G09B 19/04* (2013.01); *G10L 15/02* (2013.01); *G10L 15/22* (2013.01); *G10L 15/26* (2013.01); *G10L 25/60* (2013.01); *G10L 2015/027* (2013.01)

(58) Field of Classification Search
CPC ....... G10L 15/187; G10L 15/02; G10L 15/22; G10L 15/26; G10L 25/60; G10L 15/005; G10L 15/01; G10L 15/04; G10L 15/08
See application file for complete search history.

(56) References Cited

U.S. PATENT DOCUMENTS

| | | | | |
|---|---|---|---|---|
| 7,181,392 | B2* | 2/2007 | Gandhi | ................... G10L 15/01 704/235 |
| 9,262,941 | B2* | 2/2016 | Chen | ....................... G10L 25/60 |

(Continued)

OTHER PUBLICATIONS

Chung et al., "A Study on Automatic Measurement of Pronunciation Accuracy of English Speech Produced by Korean Learners of English", Language and Linguistics, vol. 42, pp. 165-196, (2008).

(Continued)

*Primary Examiner* — Nafiz E Hoque
(74) *Attorney, Agent, or Firm* — Vorys, Sater, Seymour and Pease LLP; Mih Suhn Koh (57) ABSTRACT

Provided herein is a method of automatically evaluating non-native speakers' pronunciation proficiency, wherein an input speech signal is received, the speech recognition module transcribes it into a text; the text is converted into a segmental string with temporal information for each phone; in the key module of feature extraction, nine features of speech rhythm and fluency are computed; and then all feature values are integrated into an overall pronunciation proficiency score. This method can be applied to both types of non-native speech input: read-aloud speech and spontaneous speech.

20 Claims, 2 Drawing Sheets

(56) References Cited

U.S. PATENT DOCUMENTS

| | | | | |
|---|---|---|---|---|
| 9,704,413 B2 * | 7/2017 | Yoon | ............... | G09B 19/06 |
| 2002/0087314 A1 * | 7/2002 | Fischer | ............... | G10L 15/07 |
| | | | | 704/255 |
| 2009/0119105 A1 * | 5/2009 | Kim | ............... | G10L 15/07 |
| | | | | 704/244 |
| 2010/0145698 A1 * | 6/2010 | Chen | ............... | G09B 7/02 |
| | | | | 704/256.1 |
| 2012/0323573 A1 * | 12/2012 | Yoon | ............... | G09B 19/06 |
| | | | | 704/236 |

OTHER PUBLICATIONS

Jang, "Speech rhythm metrics for automatic scoring of English speech by Korean EFL learners", Malsori (Speech Sounds), vol. 66, pp. 41-59, (2008).

\* cited by examiner

METHOD FOR AUTOMATIC EVALUATION OF NON-NATIVE PRONUNCIATION

TECHNICAL FIELD

This invention is related to systems and methods for automatic evaluation of non-standard human speech. Typically, the invention is used to measure pronunciation accuracy of non-native speech produced by second language learners.

BACKGROUND

Although the importance of pronunciation proficiency in foreign language learning has been more emphasized, conventional evaluation performed by human raters has restrictions as: first, human raters' evaluation faces inter- and intra-rater inconsistencies. Even a single rater frequently gives a different score when reevaluating than the score he/she previously gave to the same speech token. Second, human rating is time-consuming. When human raters' scores do not agree on a test speech token, a new rater may have to be invited. Thus, it will take a while until the final result is available. Third, human rating costs. When there are a lot of test-takers' speech to evaluate, hiring high-profile raters that are qualified and trained is difficult and costly.

Consequently, constructing automatic pronunciation evaluation systems will be useful for alleviating the difficulties. Although major language testing services including TOEFL and TOEIC appear to have started using automated systems, their methods and quality are still unveiled. The reason for less active use of automatic scoring is twofold: first, speech recognition technology has not matured enough to support automatic scoring systems. Due to incorrect pronunciation of non-native speakers, converting their speech into text was prone to many errors. However, this problem is expected to be resolved thanks to recent AI technology based on deep learning with big data. Second, more fundamental problem of automatic scoring is attributed to the difficulty in extracting effective acoustic features for automation. Efforts to contrive features simulating the rubric used in human rating have not been successful due mainly to the fact that humans tend to evaluate qualitatively depending on their linguistic knowledge and intuition, whereas machine scoring needs quantitative features.

REFERENCES

1) Grabe, E. & Low, E. L. 2002. Durational variability in speech and the rhythm class hypothesis. *Papers in Laboratory Phonology* 7: 515-546. Berlin: Mouton.
2) Neumeyer, L., Franco, H., Digalakis, V. & Weintraub, M. 2000. Automatic scoring of pronunciation quality. *Speech Communication* 30: 83-93.
3) Ramus, F., Nespor, M. & Mehler, J. 1999. Correlates of linguistic rhythm in the speech signal. *Cognition* 73: 265-292.
4) Tae-Yeoub Jang. 2008. Speech Rhythm Metrics for Automatic Scoring of English Speech by Korean EFL Learners. *Malsori (Speech Sounds)* 66: 41-59. The Korean Society of Phonetic Sciences and Speech Technology.
5) Tae-Yeoub Jang. 2009. Automatic Assessment of Non-native Prosody Using Rhythm Metrics: Focusing on Korean Speakers' English Pronunciation. in *SFU Working Papers in Linguistics* Vol. 2. Simon Fraser University, Vancouver, Canada.
6) Tae-Yeoub Jang. 2015. Duration of English function words produced by Korean EFL Students. *Language and Linguistics* 66: 373-397.
7) Witt, S. M. & Young, S. J. 2000. Phone-level pronunciation scoring and assessment for interactive language learning. *Speech Communication* 30: 95-108.

BRIEF SUMMARY OF THE INVENTION

[Goals]

The current invention of automatic evaluation of non-native speech attempts to resolve the problem stated above, by implementing linguistically verified measures into acoustic features to be used, after refinements and modifications, in automatic machine evaluation.

The current invention focuses on employing features to detect prosody and fluency errors rather than segmental errors committed by non-native speakers.

The current invention attempts to employ various types of speech rhythm and fluency features in order to minimize the evaluation errors and to maintain scoring consistency.

[Methods]

In order to achieve the goals, the current invention provides the system for automatic evaluation of non-native speech. The system is composed of four major modules:

Speech recognition: Convert test takers' acoustic speech signal into texts

Text-to-Phone conversion: Convert texts to phone strings

Feature extraction: Extract rhythm and fluency features and convert them into quantitative measures Score integration: Integrate individual scores into one pronunciation accuracy score The module of feature extraction includes two parts: speech rhythm features and fluency features.

The speech rhythm features consist of four specific measures that capture non-native speakers' erroneous prosody when they produce the target language (L2) utterances containing the different structure of speech rhythm than speakers' mother tongue (L1). More specifically, speech rhythm of a stress-based language (e.g., English, Russian, Dutch) is known to be quite different from that of a syllable-based language (e.g., French, Spanish, Korean, Chinese). Hence if a learner's target language has a different rhythm, he/she is not likely to pronounce the target language utterance correctly. Each of the four rhythm features, RCFsyl, % FW, PVI and % V are obtained by Formula 1, 2, 3, and 4, respectively.

$$RCFsyl = \frac{\frac{\sum_{c=1}^{n} d_c}{C(SYL_{cw})}}{\frac{\sum_{f=1}^{m} d_f}{C(SYL_{fw})}} \quad \langle\text{Formula 1}\rangle$$

wherein, $d_c$: duration of c'th content word
$d_f$: duration of f'th function word
C(SYLcw): number of syllables in content words
C(SYLfw): number of syllables in function words $$\% \ FW = \frac{\sum_{f=1}^{m} d_f}{\sum_{w=1}^{n} d_w} \quad \langle\text{Formula 2}\rangle$$

wherein, $d_f$: duration of f'th function word $d_w$: duration of w'th word

⟨Formula 3, based on Grabe & Low (2002)⟩

$$PVI = 100 \times \left( \sum_{k=1}^{m-1} \left| \frac{(d_k - d_{k+1})}{(d_k + d_{k+1})/2} \right| \right) / (m-1)$$

wherein, $d_k$: duration of k'th vocalic interval m: number of vocalic intervals ⟨Formula 4, based on Ramus et al. (1999)⟩

$$\%V = \frac{\sum_{v=1}^{l} d_v}{\sum_{w=1}^{n} d_w}$$

wherein, $d_v$: duration of v'th vowel $d_w$: duration of w'th word

The fluency features measure how fluently the learner can produce utterances of the target language without hesitation or stuttering. Instead of using pre-tested features such as the frequency and/or duration of pauses in each utterance, these features are further refined and modified to reflect various types of fluency errors. Each of the five fluency features, NUMbp, NUMwp, RATIObp, NUMns and RATEutt can be obtained by Formula 5, 6, 7, 8, and 9, respectively.

$$NUMbp = C(PAUbp) \qquad \text{<Formula 5>}$$

wherein, C( ): counting function

PAUbp: between-word pause $$NUMwp = C(PAUwp) \qquad \text{<Formula 6>}$$

wherein, C( ): counting function

PAUwp: within-word pause $$RATIObp = -\ln\left[ 1 + \frac{\sum_{p=1}^{s} d_p}{\sum_{w=1}^{n} d_w} \right] \qquad \text{⟨Formula 7⟩}$$

wherein, $d_p$: duration of p'th between-word pause $d_w$: duration of w'th word $$NUMns = C(NS) \qquad \text{<Formula 8>}$$

wherein, C( ): counting function

NS: non-speech section except pause and silence $$RATEutt = \frac{C(\text{syllable})}{\sum_{w=1}^{n} d_w} \qquad \text{⟨Formula 9⟩}$$

wherein, C(syllable): number of syllables $d_w$: duration of w'th word

Once all feature values are determined by these formulae, they are integrated into one overall score using the multiple regression formula stated in Formula 10.

$$\text{Integrated Score} = \beta_0 + \beta_1 \text{fea}_1 + \beta_2 \text{fea}_2 + \ldots + \beta_n \text{fea}_n \qquad \text{<Formula 10>}$$

wherein, $\text{fea}_n$: n'th feature value $\beta_0$: intercept or learner's base score $\beta_n$: weight value of n'th feature These key procedures of 'feature extraction' and 'score integration' of the current invention are preceded by an important processing module named 'speech recognition' which receives the test speech signal and transcribes it into the corresponding text and performs 'text-to-phone' conversion by which the orthographic text is converted into a phone string with each phone boundary demarcated by temporal information.

Effects of Invention

This work can be directly implemented into practical applications such as systems for foreign language testing services, various EFL learning software and mobile apps. Evaluation of spoken language is quite costly and inconsistent. Human rating is so often inconsistent across raters or even a single rater may frequently make different judgements on the same speech token when evaluating at different times. That is why multiple raters participate in evaluation of a single test-taker's speech tokens. If a machine scoring system is established with well-testified features, a huge amount of time and money for human scoring can be saved and a considerable amount of evaluation mismatches can be reduced. Also, the current invention will establish a foothold for more consistent and reliable machine scoring in non-native speech evaluation. The major language evaluation services and other sectors where English proficiency tests are performed will directly benefit from this enhanced autoscoring method.

DETAILED DESCRIPTION

As this invention can have various alterations and demonstrative examples, these examples will be illustrated in detail through figures and tables. However, it is not intended to restrict the current invention into a specific type. Rather, it should be understood that the invention covers all the alterations, and that relevant modifications and substitutes are covered within the range of the current invention's ideas and skills. For the convenience of description and exemplification, for instance, when the first language (L1) and the target language (L2) of language learners are mentioned, L1 is assumed to be one of Korean and L2 will be assumed to be English. However, in real applications of the invention, L1 and L2 can be any language with different prosodic structure.

<Types of Pronunciation Errors>

Pronunciation errors committed by non-native speakers can be classified into three types such as shown in Table 1.

TABLE 1

Types of L2 errors

| Error Types | Phonetic unit of errors | Example |
| --- | --- | --- |
| Segmentals | individual phoneme/phone | phone substitution (f-> p, ow --> ɔ) |
| Prosody | rhythm, intonation, stress | focuses on function words |
| Fluency | pause, speech rate | slow speech with frequent short pauses |

An important task of automatic evaluation is to extract these characteristics in the form of quantitative measures. The current invention focuses on the prosody and fluency errors rather than segmental errors, for three reasons. First, it is extremely difficulty to extract features to detect specific segmental errors. The frequently used methods known as likelihood-based Goodness of Pronunciation (GOP) proposed by Witt & Young (2000) and Newmeyer et al. (2000) can capture the general difference between native speakers' reference pronunciation and corresponding non-native speakers' speech. But their techniques are limited in that quantitative features for individual sounds cannot be specified and that intuitive interpretation is hard to be provided despite the difference is detected. Second, the methods will fail to capture many linguistic, social and dialectal variations. For example, segmental pronunciations of American English and British English are obviously different in various ways (e.g., [owvər] vs [əwvə] for the word 'over'). But modeling all the acceptable segmental variations is not realistic. Third, segmental errors are mostly found in speech produced by non-native speakers with relatively lower level proficiency.

Therefore, the current invention concentrates on extracting measures detecting incorrect pronunciation that can be categorized as errors of prosody and fluency. Unlike segmental characteristics, these quantitative features will represent non-native proficiency more effectively as they are quite robust to diverse legitimate pronunciation variations.

Regarding prosody features, extracting characteristics of speech rhythm is preferred to those of intonation for the following reason. Intonation patterns are not uniformly fixed, even for a very short utterances spoken by native speakers. Pitch accents, known as a characterizing event of intonation pattern, are so variable depending upon the contexts and speakers that it is not feasible to use them as a decisive clue to correct intonation patterns. Moreover, as a salient characteristic of pitch and intonation called Fundamental Frequency (F0), is also part of another prosodic event like linguistic 'stress' or 'contrastive focus', isolating that feature for an intonational correlate is extremely difficult.

On the other hand, features related to speech rhythm do not suffer that kind of complications. Above all, their pattern of transfer from language learners' mother tongue (L1) to the target language (L2) is relatively regular and free from segmental variations. Another critical advantage is that these rhythm features can be computed very easily as most of them are based on temporal characteristics. Furthermore, speech rhythm also implies some characteristics of pitch accents and/or sentence stresses which are events of intonation, meaning that the speech rhythm is considered to include various prosodic characteristics of spoken language, In other words, employing rhythm features can be regarded as performing a comprehensive analysis of speech prosody.

As for fluency characteristics, although extracting their quantitative features is an effortless process, there is at the same time a risk of possible distortion. In order to prevent this side effect and achieve a more robust implementation, the current invention attempts to give an additional modification and refinement to these features before they are extracted.

<Feature Extraction>

The core process of automatic evaluation is obviously the extraction of features that can be represented quantitatively. In this section, its detailed process will be described including specific formulas and their meanings. As previously mentioned, there are two feature types: speech rhythm and fluency.

1. Speech Rhythm Features

World languages are conventionally classified into two categories based on speech rhythm structure of each language: stress-based rhythm and syllable-based rhythm, Although the concept of strict dichotomy does not seem to be maintained, it has been confirmed through many linguistic research that if speech rhythm of a learner's L1 and the target language (L2) he/she is learning has different structures, the learner's utterance will be produced with considerable foreign-accentedness due to tendency of maintaining L1 rhythm. Hence, the features characterizing speech rhythm of utterances will properly reveal this foreign-accentedness. The speech rhythm features used in the current invention and their extraction formula are listed in Table 2. Previous linguistic experiments have found these features to be useful in differentiating languages belonging to different rhythm category.

TABLE 2

Speech rhythm features

| Feature | Description | Extraction Formula |
| --- | --- | --- |
| RCFsyl | Ratio of 'the mean syllable duration of content words' to 'the mean syllable duration of function words' (Jang 2015) | $\dfrac{\sum_{c=1}^{n} d_c / C(SYL_{cw})}{\sum_{f=1}^{m} d_f / C(SYL_{fw})}$ |
| | | $d_c$: duration of c'th content word $d_f$: duration of f'th function word C(SYLcw): number of syllables in content words C(SYLfw): number of syllables in function words |
| %FW | Ratio of function words in an utterance (Jang 2008, 2009) | $\dfrac{\sum_{f=1}^{m} d_f}{\sum_{w=1}^{n} d_w}$ |
| | | $d_f$: duration of f'th function word $d_w$: duration of w'th word |
| PVI | Pair-wise vocalic interval variability (Grabe & Low 2002) | $100 \times \left( \sum_{k=1}^{m-1} \left| \dfrac{d_k - d_{k+1}}{(d_k + d_{k+1})/2} \right| \right) / (m-1)$ |
| | | $d_k$: duration of k'th vocalic interval m: number of vocalic intervals |

TABLE 2-continued

Speech rhythm features

| Feature | Description | Extraction Formula |
| --- | --- | --- |
| %V | Ratio of vocalic intervals in an utterance (Ramus et al. 1999) | $\dfrac{\sum_{v=1}^{t} d_v}{\sum_{w=1}^{n} d_w}$ <br><br> $d_v$: duration of v'th vowel <br> $d_w$: duration of w'th word |

[% FW]

The rationale of employing features RCFsyl and % FW is as follows: In stress-based languages, function words are remarkably reduced as compared to content words. On the contrary, utterances of syllable-based languages do not have this characteristic of reduction or weakening. As a result, speakers of a syllable-based language will fail to pronounce correctly utterances of the target language with the stress-based rhythm. The lower the speakers' proficiency of the target language, the more severe degree of failure is expected to appear. The feature % FW measures the proportion of the accumulated duration of all function words in an utterance divided by the total duration of spoken words the utterance. It should be noted that the denominator in the formula is not just the total duration of the utterance but sum of all uttered word items. This is to exclude the duration of any non-speech intervals such as short pauses, hesitations or interjections that may be inserted during the production of that utterance.

[RCFsyl]

One disadvantage of the feature % FW is that this measure can be useful only when there exists a reference value obtained from utterances spoken by one or more native speakers. This implies that, if there are two different sentences, % FW of one sentence is not compatible with the % FW value of the other sentence. This is because the two sentences will be composed of different lexical items and different number and proportion of function and content words. In an effort to avoid, or at least alleviate, this restriction, a new measure named RCFsyl is contrived. The basic idea of this measure is to compute the ratio of 'the mean syllable duration of content words' to 'the mean syllable duration of function words' in an utterance unit. Unlike % FW, RCFsyl can be used on any utterance units with at least one function word and one content word.

[PVI]

The measure of PVI is introduced by Grabe & Low (2002). Their experiments verified that the syllable structure of stress-based languages is more elastic and variable than that of syllable-based languages. This is due to the fact that stressed syllables and unstressed syllables are more likely to appear alternately than consecutively. Consequently, if sum of pair-wise durational variability is calculated, its magnitude will be greater for utterances of stress-based languages than syllable-based languages. The rationale of the current invention is that language learners whose L1 is a syllable-based language is not likely to produce utterances of the stress-based target language with as much variability in syllable duration as native speakers of that language. Originally, two relevant PVI measures were suggested, each to quantify vocalic interval variability and consonantal interval variability. But the current invention adopted only the vocalic interval variability based on a number of verification experiments.

[% V]

The measure of % V is introduced by Ramus et al. (1999). They found that the unstressed syllables of stress-based languages can be dramatically reduced, weakened or even deleted. The vowel portions will be more severely affected by this phenomenon than consonantal portions. On the contrary, most syllables in syllable-based languages tend to maintain their duration without losing major acoustic characteristics of their vowel quality. As a result, the proportion of vocalic intervals in an utterance will be greater in general on utterances in stress-based languages than syllable-based languages. The rationale of the current invention is that language learners whose L1 is a syllable-based language is more likely to produce, transferring their L1 situation, utterances of the stress-based target language with more vocalic portion than its native speakers.

2. Fluency Features

The two common errors language learners make when producing L2 utterances are slow speech rate and insertion of frequent pauses. Thus, such features as number of pauses, duration of pauses, and speech rate measure can be useful for automatic evaluation. But features obtained by simply counting the number appearance or measuring total duration may not work effectively. Thus, necessary subdivision of features and refining on extraction methods are performed. As a result, five features to measure fluency are introduced as shown in Table 3.

TABLE 3

Fluency features

| Feature | Description | Extraction Formula |
| --- | --- | --- |
| NUMbp | The number of between-word pauses | C(PAUbp) <br> C( ): counting function <br> PAUbp: between-word pause |
| NUMwp | The number of within-word pauses | C(PAUwp) <br> C( ): counting function <br> PAUwp: within-word pause |
| RATIObp | Ratio of pause duration in an utterance | $-\ln\left[1 + \dfrac{\sum_{p=1}^{s} d_p}{\sum_{w=1}^{n} d_w}\right]$ <br><br> $d_p$: duration of p'th between-word pause <br> $d_w$: duration of w'th word |
| NUMns | Number of non-speech voice fillers such as hesitation and interjections. | C(NS) <br> C( ): counting function <br> NS: non-speech section except pauses and silences |
| RATEutt | Speed of speech in syllables/sec | $\dfrac{C(\text{syllable})}{\sum_{w=1}^{n} d_w}$ <br><br> C(syllable): number of syllables <br> $d_w$: duration of w'th word |

[NUMbp]

This feature is obtained by counting the number of pauses that appear between words. This is to penalize L2 speech with unreasonably frequent pauses.

[NUMwp]

This feature is obtained by counting the number of pauses that appear inside words. A characteristic of non-fluent speech is that even individual words can be pronounced with a pause inside. The feature is intended to capture this error that is more frequently made by low-level learners.

[RATIObp]

This measures what portion of an utterance is composed of pauses. As many utterances even produced by L2 learners may not have few pauses, this measure can be a very small value, which is why it is represented in terms of natural logarithm.

[NUMns]

This feature counts the number of all non-speech sections including interjections, hesitation and various voice fillers. Learners' speech tends more frequently to contain these items that do not have any lexical information or major semantic property.

[RATEutt]

The feature captures the speed of utterance production by measuring the number of syllables per one second. In most cases, L2 speech is slower than the corresponding L1 speech. As shown in the formula this feature can be obtained by measuring the number of syllables divided by the total duration of word articulation in the utterance. Note that eligible speech rate can be obtained when pauses and non-speech sections are excluded in the articulation duration.

<Flow of Automatic Pronunciation Evaluation>

Figure 1:
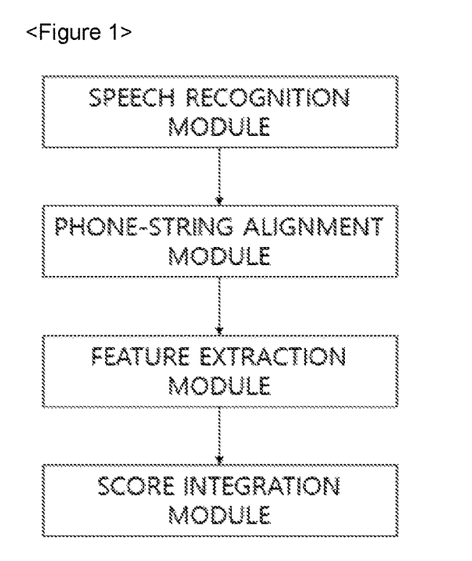
FIG. 1. Modules of automatic evaluation
Figure 2:
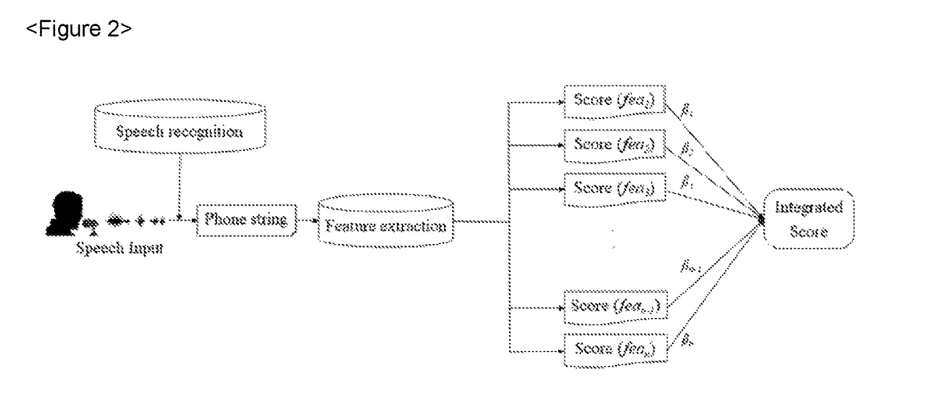
FIG. 2. Processes of automatic evaluation

The major modules of automatic pronunciation evaluation can be depicted as in FIG. 1. When non-native speech input is received, the speech recognition module transcribes it into texts and subsequently into the corresponding phone string. Then, temporal information of the start and end point of each phone is detected. Based on the boundary information, values of nine features are computed. Finally, These feature values are integrated into the overall pronunciation score. The overall processes are summarized in FIG. 2.

1. Speech Recognition

The state-of-the-art techniques of automatic speech recognition (ASR) apply to this process for best performance. Depending on types of evaluation, there are two different procedures of speech recognition. If the input is a read-aloud speech token, produced by a test-taker reading a provided text, demarcating phone boundaries is relatively simple as this process is based on the known-text. If, otherwise, the signal input is a spontaneous speech token, the all-scale ASR processes should be employed in order to covert speech into texts. The recognition should be conducted along with a special treatment so that its performance on recognizing non-native speech can be optimized. This enhancement can, for instance, be achieved by designing and implementing an extensive dictionary enlisted with diverse pronunciation variations that can be produced by non-native speakers. When speech is successfully converted into texts, the remaining procedure of phone alignment is the same as when read-aloud speech was provided as input.

2. Feature Extraction

Once the segmental string is given with temporal information of each boundary by the ASR process, feature extraction, the core work of the current invention, is ready to be performed. The set of nine features previously described can be computed using each formula. When other features are discovered in the future they can be easily added to the current feature set.

3. Score Integration

After feature calculation, the test speech token is now represented by a set of nine feature values. Then, the values need to be integrated into a final pronunciation score. To put this process in more technical terms, a coefficient or weight for each feature need to be determined. There are a few statistical modeling techniques that can be used for this step including Multiple Regression and Support Vector Machine (SVM). Formula 10. shown previously and restated below is an example of Multiple Regression model.

$$\text{Integrated Score} = \beta_0 + \beta_1 \text{fea}_1 + \beta_2 \text{fea}_2 + \ldots + \beta_n \text{fea}_n \quad \text{<Formula 10>}$$

Figure 3:
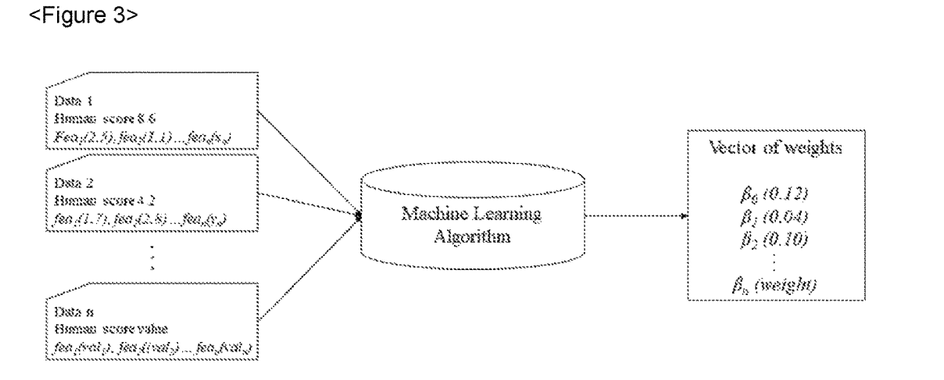
FIG. 3. Feature weight decision

Where, $\text{fea}_n$: n'th feature value
$\beta_0$: intercept or learner's base score
$\beta_n$: weight value of n'th feature The intercept ($\beta_0$) and feature coefficients ($\beta_{0 \ldots n}$) can be estimated by analyzing a corpus where each utterance token is assigned a pre-defined overall score. This process is depicted in FIG. 3. This practical machine learning task can easily be performed even through various public software tools like R or SPSS as well as direct implementations. The success in constructing the high-quality autoscorer depends a lot upon whether a sufficient size of training data. Current development in technology of fast data collection and big data management are will certainly be a great help.

As previously mentioned, the above description in terms of exemplification should not be interpreted as a restricted function of the current invention. All possible methods for extensions and applications as well as fundamental ideas and practical implementations should be comprehensively included within the range of the current invention.

The invention claimed is:

1. A system of automatically evaluating non-native speech, comprising:

an automatic recognition module for automatically recognizing non-native speech input;

a text converting module for converting text from the non-native speech received by the automatic recognition module;

a feature extraction module for extracting feature values of speech rhythm and fluency from the non-native speech received by the automatic recognition module; and a calculation module for calculating an overall target language proficiency score based on the extracted values by the feature extraction module;

wherein the feature values of speech rhythm include:

$\text{fea}_1$, value of ratio of syllable duration time of content portion in the non-native speech to syllable duration time of function portion in the non-native speech;

$\text{fea}_2$, value of ratio of the function portion in the duration time of utterance portion in the non-native speech;

$\text{fea}_3$, value of pair-wise vocalic interval variability; and $\text{fea}_4$, value of ratio of vocalic intervals in the utterance portion in the non-native speech, the feature values of fluency include:

$\text{fea}_5$, value of the number of between-word pauses in the non-native speech;

$\text{fea}_6$, value of the number of within-word pauses in the non-native speech;

$\text{fea}_7$, value of ratio of pause duration in the utterance portion in the non-native speech;

$\text{fea}_8$, value of the number of non-speech voice fillers of hesitation and interjections in the non-native speech; and $\text{fea}_9$, value of speed of the non-native speech, and the overall target language proficiency score is calculated from the following score equation:

$$\beta_0 + \Sigma_{n=1}^{9} \beta_n \times \text{fea}_n \quad \text{<Score equation>}$$

wherein $fea_n$ is $n^{th}$ feature value, $\beta_0$ is the predetermined base score, and $\beta_n$ is predetermined weight value for the $n^{th}$ feature value $fea_n$.

2. The system of claim 1, wherein the $fea_1$ is calculated through Formula 1:

$$fea_1 = \frac{\frac{\sum_{c=1}^{n} d_c}{C(SYL_{cw})}}{\frac{\sum_{F=1}^{m} d_f}{C(SYL_{fw})}} \qquad \langle \text{Formula 1} \rangle$$

wherein $d_c$ is duration of $c^{th}$ content word, $d_f$ is duration of $f^{th}$ function word, $C(SYL_{cw})$ is the number of syllables in content words, and $C(SYL_{fw})$ is the number of syllables in function words.

3. The system of claim 1, wherein the $fea_2$ is calculated through Formula 2:

$$fea_2 = \frac{\sum_{f=1}^{m} d_f}{\sum_{w=1}^{n} d_w} \qquad \langle \text{Formula 2} \rangle$$

wherein $d_f$ is duration of $f^{th}$ function word, and $d_w$ is duration of $w^{th}$ word.

4. The system of claim 1, wherein the $fea_3$ is calculated through Formula 3:

$$fea_3 = 100 \times \left( \sum_{k=1}^{m-1} \left| \frac{d_k - d_{k+1}}{(d_k + d_{k+1})/2} \right| \right) / (m-1) \qquad \langle \text{Formula 3} \rangle$$

wherein $d_k$ is duration of $k^{th}$ vocalic interval, and m is the number of vocalic intervals.

5. The automatic system of claim 1, wherein the $fea_4$ is calculated through Formula 4:

$$fea_4 = \frac{\sum_{v=1}^{l} d_v}{\sum_{w=1}^{n} d_w} \qquad \langle \text{Formula 4} \rangle$$

wherein $d_v$ is duration of $v^{th}$ vowel, and $d_w$ is duration of $w^{th}$ word.

6. The system of claim 1, wherein the $fea_5$ is calculated through Formula 5:

$fea_5$=the number of counts of between-word pause.   $\langle$Formula 5$\rangle$ 7. The system of claim 1, wherein the $fea_6$ is calculated through Formula 6:

$fea_6$=the number of counts of within-word pause.   $\langle$Formula 6$\rangle$ 8. The system of claim 1, wherein the $fea_7$ is calculated through Formula 7:

$$fea_7 = -\ln\left[ 1 + \frac{\sum_{p=1}^{s} d_p}{\sum_{w=1}^{n} d_w} \right] \qquad \langle \text{Formula 7} \rangle$$

wherein $d_p$ is duration of $p^{th}$ between-word pause, and $d_w$ is duration of $w^{th}$ word.

9. The system of claim 1, wherein the $fea_8$ is calculated through Formula 8:

$fea_8$=the number of counts of non-speech section except pause and silence.   $\langle$Formula 8$\rangle$ 10. The system of claim 1, wherein the $fea_9$ is calculated through Formula 9:

$$fea_9 = \frac{\text{the number of syllables}}{\sum_{w=1}^{n} d_w} \qquad \langle \text{Formula 9} \rangle$$

wherein $d_w$ is duration of $w^{th}$ word.

11. A method for automatically evaluating non-native speech by using a system comprising:
   an automatic recognition module for automatically recognizing non-native speech input;
   a text converting module for converting text from the non-native speech received by the automatic recognition module;
   a feature extraction module for extracting feature values of speech rhythm and fluency from the non-native speech received by the automatic recognition module; and
   a calculation module for calculating an overall target language proficiency score based on the extracted values by the feature extraction module;
the method comprising:
   a step for recognizing non-native speech input by using the automatic recognition module;
   a step for converting text from the non-native speech received by the automatic recognition module by using the text converting module;
   a step for extracting feature values of speech rhythm and fluency from the non-native speech received by the automatic recognition module by using the feature extraction module; and
   a step for calculating an overall target language proficiency score based on the extracted values by the feature extraction module by using calculation module;
wherein the feature values of speech rhythm include:
   $fea_1$, value of ratio of syllable duration time of content portion in the non-native speech to syllable duration time of function portion in the non-native speech;
   $fea_2$, value of ratio of the function portion in the duration time of utterance portion in the non-native speech;
   $fea_3$, value of pair-wise vocalic interval variability; and
   $fea_4$, value of ratio of vocalic intervals in the utterance portion in the non-native speech, the fluency feature values include:
   $fea_5$, value of the number of between-word pauses in the non-native speech;
   $fea_6$, value of the number of within-word pauses in the non-native speech;
   $fea_7$, value of ratio of pause duration in the utterance portion in the non-native speech;

$fea_8$, value of the number of non-speech voice fillers of hesitation and interjections in the non-native speech; and $fea_9$, value of speed of the non-native speech, and in the step for calculating the overall target language proficiency score, the overall target language proficiency score is calculated from the following score equation:

$$\beta_0 + \sum_{n=1}^{9} \beta_n \times fea_n \qquad \langle\text{Score equation}\rangle$$

wherein $fea_n$ is $n^{th}$ feature value, $\beta_0$ is the predetermined base score, and $\beta_n$ is predetermined weight value for the $n^{th}$ feature value $fea_n$.

12. The method of claim 11, wherein the $fea_1$ is calculated through Formula 1:

$$fea_1 = \frac{\frac{\sum_{c=1}^{n} d_c}{C(SYL_{cw})}}{\frac{\sum_{F=1}^{m} d_f}{C(SYL_{fw})}} \qquad \langle\text{Formula 1}\rangle$$

wherein $d_c$ is duration of $c^{th}$ content word, $d_f$ is duration of $f^{th}$ function word, $C(SYL_{cw})$ is the number of syllables in content words, and $C(SYL_{fw})$ is the number of syllables in function words.

13. The method of claim 11, wherein the $fea_2$ is calculated through Formula 2:

$$fea_2 = \frac{\sum_{f=1}^{m} d_f}{\sum_{w=1}^{n} d_w} \qquad \langle\text{Formula 2}\rangle$$

wherein $d_f$ is duration of $f^{th}$ function word, and $d_w$ is duration of $w^{th}$ word.

14. The method of claim 11, wherein the $fea_3$ is calculated through Formula 3:

$$fea_3 = 100 \times \left(\sum_{k=1}^{m-1} \left|\frac{d_k - d_{k+1}}{(d_k + d_{k+1})/2}\right|\right) / (m-1) \qquad \langle\text{Formula 3}\rangle$$

wherein $d_k$ is duration of $k^{th}$ vocalic interval, and m is the number of vocalic intervals.

15. The method of claim 11, wherein the $fea_4$ is calculated through Formula 4:

$$fea_4 = \frac{\sum_{v=1}^{m} d_v}{\sum_{w=1}^{n} d_w} \qquad \langle\text{Formula 4}\rangle$$

wherein $d_v$ is duration of $v^{th}$ vowel, and $d_w$ is duration of $w^{th}$ word.

16. The method of claim 11, wherein the $fea_5$ is calculated through Formula 5:

$$fea_5 = \text{the number of counts of between-word pause.} \qquad \langle\text{Formula 5}\rangle$$

17. The method of claim 11, wherein the $fea_6$ is calculated through Formula 6:

$$fea_6 = \text{the number of counts of within-word pause.} \qquad \langle\text{Formula 6}\rangle$$

18. The method of claim 11, wherein the $fea_7$ is calculated through Formula 7:

$$fea_7 = -\ln\left[1 + \frac{\sum_{p=1}^{m} d_p}{\sum_{w=1}^{n} d_w}\right] \qquad \langle\text{Formula 7}\rangle$$

wherein $d_p$ is duration of $p^{th}$ between-word pause, and $d_w$ is duration of $w^{th}$ word.

19. The method of claim 11, wherein the $fea_8$ is calculated through Formula 8:

$$fea_8 = \text{the number of counts of non-speech section except pause and silence.} \qquad \langle\text{Formula 8}\rangle$$

20. The method of claim 11, wherein the $fea_9$ is calculated through Formula 9:

$$fea_9 = \frac{\text{the number of syllables}}{\sum_{w=1}^{n} d_w} \qquad \langle\text{Formula 9}\rangle$$

wherein $d_w$ is duration of $w^{th}$ word.

* * * * *